Patented Feb. 28, 1939

2,149,233

UNITED STATES PATENT OFFICE 2,149,233

BIOLOGICAL PRODUCT

Gregory Shwartzman, New York, N. Y., assignor to Mount Sinai Hospital Research Foundation, Inc.

No Drawing. Application April 6, 1936, Serial No. 72,979

8 Claims. (Cl. 167—78)

This invention relates to reactive toxins and their homologous antitoxins, and mixtures thereof.

The present application is a continuation in part of my co-pending application Serial No. 600,076, filed March 19, 1932, now Patent No. 2,036,649, dated April 7, 1936; and through it is in part a continuation of my earlier application Serial No. 335,389, filed January 26, 1929.

It is an object of my present invention to provide reactive toxins and homologous antitoxins therefor, and mixtures in varying proportions of these reactive toxins and their homologous antitoxins, all of determined biological potency as determinable by the Shwartzman phenomenon, for various biological and therapeutic uses.

By reactive toxins I mean those which are capable of producing the Shwartzman phenomenon, as set forth in my aforesaid co-pending application Serial No. 600,076, now Patent No. 2,036,649.

By the Shwartzman phenomenon, an intradermal injection of a reactive toxin induces such a state of reactivity that if after a suitable incubating period, for which twenty-four hours is an effective length, an intravascular injection be made of a sufficient amount of the same or another reactive toxin, a pronounced reaction occurs at the site of the intradermal injection, with hemorrhage in varying intensity, and with or without inflammation and necrosis.

By use of the Shwartzman phenomenon, these reactive toxins may be demonstrated, and filtrates or other menstruums containing them made of a determined biological potency with respect to their content of said reactive toxins. They may be used as antigens to cause the production of homologous antitoxins or neutralizing serums; which in turn may be made of determined biological potency by use of the Shwartzman phenomenon, with the reactive toxin used in one of the aforesaid two injections neutralized in varying degree by admixture with the homologous antitoxins; for example, according to one of the procedures disclosed and claimed in my aforesaid co-pending application Serial No. 600,076.

Both such a reactive toxin and its homologous antitoxin are not only of great value in making use of the Shwartzman phenomenon, to demonstrate various reactive toxins and their antitoxins and to determine their biological potency, but are also of direct value therapeutically, as in creating active and passive immunity respectively, in the prophylaxis and treatment of diseases produced by the causative agents with which the reactive toxins are obtained.

Likewise, such mixtures of reactive toxins and their homologous antitoxins, and more especially those in which the amount of the homologous antitoxin is only sufficient to cause partial neutralization of the reactive toxin with which it is mixed, have been found therapeutically effective.

A reactive toxin such as my present invention contemplates may be made from any disease-causative agent of which the toxin is capable of causing the Shwartzman phenomenon.

The procedure for producing such a reactive toxin follows in general that used in producing other toxins; and, as is the case with the regular production of other toxins, is subject to the proper selection of organisms, the proper control of conditions such as temperature and media, and other factors, in accordance with principles recognized among those skilled in the art. This general procedure is as follows:

The selected organism is planted in a suitable medium, say on a plain or tryptic digest broth or on an agar solid medium. The planted medium is incubated at a suitable temperature, about 37–38° C. being desirable in most instances. While incubation may be carried out for varying periods of time, say 1 to 8 days, as a general rule a fairly short incubation period, such as 1 to 2 days with an agar medium and 3 to 4 days with a broth medium, is preferable.

After suitable incubation, the reactive toxin which has been produced is separated from the organisms, with or without heating and with or without the addition of a bactericidal or bacteriostatic agent. When the medium is a liquid, it is suitably clarified, as by filtering through paper or cotton, or by centrifuging; and the clarified medium containing the reactive toxin then passed through a Berkefeld or other suitable sterilizing filter. When the medium is a solid, it is washed with a suitable menstruum, such as normal sodium chloride solution, and the washings treated as just described for the liquid medium. In either case additional sterilizing steps may be used, such as the application of heat and/or adding a suitable germicide. The filtrate obtained contains the reactive toxin, and is generally used as such; and is tested by use of the Shwartzman phenomenon to determine its biological potency. If not of the desired determined biological potency for therapeutic or other use as thus prepared, its potency may then be adjusted to the desired value by suitable dilution or concentration.

The folowing are examples:

*Example 1.*—Flasks which each contain about 200 cc. of trytic digest broth of initial pH 7.8 are each inoculated with the entire growth of one 24-hour old agar slant culture of *B. typhosus*. A suitable strain is one known as $T_L$, which is mouse-virulent. The inoculated flasks are incubated at about 37.5° C. for from 3 to 6 days. They are then removed from the incubator, and the broth growth is filtered through cotton and then through soft filter paper. The filtrate thus obtained is passed through a Berkefeld filter to render it sterile. A suitable preservative may be added if desired.

*Example 2.*—Kolle flasks which each contain plain veal infusion agar of about pH 7.4–7.6 are each inoculated with 2 to 4 cc. of an 18-hour to 20-hour growth of *B. typhosus,* of the strain known as $T_L$, suspended in normal saline solution. The inoculated flasks are incubated at about 37.5° C. for about 20 to 24 hours, and are then removed from the incubator. The growth on the agar in each flask is then washed off with 2 to 4 cc. of normal saline solution, to which an appropriate preservative may be added. The washings are then pooled, and the pooled washings are centrifuged; and the supernatant fluid is passed through a Berkefeld filter to render it sterile. The procedure is desirably carried through with little delay in order to prevent autolysis of the organisms. The *B. typhosus* reactive toxin produced in this manner, without further dilution or concentration, usually contains from 100 to 1000 Shwartzman reacting units per cc., if the culture is of the usual virulence; but of course, as is universal with bacteria, the virulence of the organisms may vary over wide limits, sometimes even disappearing and sometimes becoming abnormally high; so that toxin produced must be tested by the Shwartzman phenomenon or some variant of it. If the filtrate shows an unsatisfactory yield of the reactive toxin when produced in the manner indicated, it may be better to discard it and start with the production of another batch of filtrate than to concentrate the filtrate to a desired strength. If unsatisfactory yields persist with a given culture strain, it is often if not generally desirable that such strain should be discarded and further production of the filtrate started with the use of a different culture strain.

*Example 3.*—Kolle flasks which each contain 0.1–0.5% glucose veal infusion agar of about pH 7.4 are each inoculated with 2 to 4 cc. of an 18-hour to 20-hour growth of meningococci suspended in normal saline solution. A suitable strain is the one known as 44B, belonging to Serological Group I. The inoculated flasks are incubated at about 37.5° C. for about 18 to 22 hours, and are then removed from the incubator. The growth on the agar in each flask is then washed off with 2 to 4 cc. of normal saline solution, to which an appropriate preservative may be added. The washings are then pooled, and the pooled washings are centrifuged; and the supernatant fluid is passed through a Berkefeld filter to render it sterile. The procedure is desirably carried through with little delay in order to prevent autolysis of the organisms.

The filtrate containing the meningococcus reactive toxin produced in this manner, without further dilution or concentration, usually contains between 300 to 5000 Shwartzman reacting units of reactive toxin per cc.; but this depends on the virulence and viability of the culture, and may vary widely, and sometimes may even disappear or become too low for effective use.

*Example 4.*—Kolle flasks which each contain plain veal infusion broth agar of about pH 7.4–7.6 are each inoculated with 2 to 4 cc. of an 18-hour to 20-hour growth of *B. coli,* suspended in normal saline solution. A strain that has been used with satisfactory results is that locally known in Mount Sinai Hospital, New York, as the Lewis strain. The inoculated flasks are incubated at about 37.5° C. for about 20 to 24 hours, and are then removed from the incubator. The growth on the agar in each flask is then washed off with 2 to 4 cc. of normal saline solution, to which an appropriate preservative may be added, and the washings treated as before.

The *B. coli* reactive toxin produced in this manner, without further dilution or concentration, usually contains from 50 to 1000 Shwartzman reacting units per cc., subject to similar variations in yield and changeableness in virulence of the culture strain as met with in dealing with other types of bacteria.

The agar method yields filtrates which have little or none of the extraneous protein material which the broth filtrates contain.

Either the broth method or the agar method may be used to obtain reactive toxins from any of a great variety of organisms. These include, besides those above more specifically mentioned, pneumococcus, types I, II, and III; *B. paratyphosus* A and B; *B. enteritidis; B. dysenteriae,* types Y, Z, Mount Desert, Shiga and Flexner; members of the hemorrhagic septicemia group; streptococci from acute rheumatic fever; *Streptococcus viridans* from abscesses; *Streptococcus hemolyticus* from mastoiditis; *Cholera vibrio; B. Pertusis; B. influenza;* and gonococcus.

In all of these cases, the filtrate is tested by means of the Shwartzman phenomenon to determine its biological potency as respects its content of the reactive toxin, and is made of the desired determined biological potency by appropriate dilution or concentration.

Any of the filtrates so prepared and tested or other compositions of determined biological potency as respects their content of reactive toxin may now be used to produce antitoxins or neutralizing serums. This procedure also follows in general that used for the production of other antitoxins or neutralizing serums, with such variations as will be made by those skilled in the art in following the procedure.

In general, that procedure is as follows: The reactive toxin of determined biological potency is administered to healthy animals, most conveniently horses, in gradually increasing doses over a period of time, usually several months. The administration is by any of the known methods, usually conveniently subcutaneous. If intravascular administrations are used, or both intravascular and subcutaneous administrations are used, the injections are spaced to obviate the occurrence of the Shwartzman phenomenon.

Sample bleedings from the horse or other animal are taken from time to time, and the blood serum titrated by means of the Shwartzman phenomenon. When a sample bleeding shows a sufficiently high titer of the desired antitoxin, the horse is subjected to production bleedings from time to time, and the blood is treated in well-known manner to secure the antitoxin or neutralizing serum therefrom, desirably in refined and concentrated form. The antitoxin or neutralizing serum thus obtained is titrated by means of the Shwartzman phenomenon; and made of the desired determined biological potency by suitable dilution or concentration.

For example, either the typhoid reactive toxin produced by growing the culture on a plain broth as described in Example 1, or the meningococcus reactive toxin produced by growing the culture on an agar medium as described in Example 3, may be used in this manner in the production of antitoxin or neutralizing serum.

In doing this, healthy horses about 8 to 12 years old are selected, and the reactive toxin injected, usually subcutaneously. The first injection is usually of about 1000 to 5000 Shwartzman reacting units of the reactive toxin. Injections are then made about once a week. Each injection is conveniently about 20% larger than the previous one, the increment varying with the tolerance of the horse used, until a suitable maximum dose is reached which the horse will tolerate, and which is usually between 50,000 and 125,000 Shwartzman reacting units depending both on the horse and on the character of the reactive toxin; and this maximum dose is administered about once a week until sample bleedings show a suitable potency in the blood serum. This procedure is varied as required by the reaction in the horse, because horses differ in their reactions. If after several weeks the indications from the sample bleedings are that the horse is failing to develop the desired antitoxin, it is usually best to discontinue treatments of that horse and start with another horse. Usually 4 to 12 months are required to produce an antitoxin of suitable potency.

It is usually desirable to carry out this antitoxin-producing treatment of horses with polyvalent reactive toxins—that is, with mixtures of reactive toxins obtained from a plurality of strains of organisms of the same species. In this way a polyvalent antitoxin may be obtained from horses.

A convenient method of titrating a reactive toxin is by epilating the abdomen of a susceptible animal, such as a rabbit, as by applying a solution of barium sulfide, and then making a plurality of intradermal injections of the reactive toxin or suspected reactive toxin at various locations on the epilated abdomen, using a different amount of toxin for each injection. The animal is then allowed to rest for about twenty-four hours as an incubating period during which a state of reactivity develops. Such state of reactivity increases to a peak value in about that time, and then diminishes so that after about two or three days it has usually entirely disappeared. During the period that state of reactivity continues, and desirably while it is at or fairly near its peak value, the animal is given an intravascular injection of a reactive toxin—which may be the same reactive toxin which was used for the intradermal injections, or a different one. At those sites of intradermal injection where a sufficient quantity of reactive toxin had been injected some twenty-four hours earlier, but not at the other sites, a violent reaction occurs, with hemorrhage, and with or without inflammation and necrosis. In this way, the biological potency of the reactive toxin may be determined with considerable accuracy. The unit of reactive toxin is the least amount of such toxin which at its site of intradermal injection will cause such a reaction when the subsequent intravascular injection is made.

In using the Shwartzman phenomenon to titrate the biological potency of an antitoxin homologous to a reactive toxin, samples of the antitoxin are mixed with the homologous reactive toxin in varying proportions; and those mixed samples of varying proportions of toxin and antitoxin are used for either the intradermal injections or the intravascular injection.

When the intradermal injections are of such mixtures, the subsequent intravascular injection of a reactive toxin produces a typical Shwartzman reaction at those sites of intradermal injection where the injected mixture contained too little antitoxin to neutralize the reactive toxin in the mixture, but produces no such Shwartzman reaction at those sites of intradermal injection where the injected mixture contained sufficient antitoxin for that neutralization. In this way several mixtures of varying proportions of reactive toxin and its homologous antitoxin may be tested on the same animal simultaneously.

When the intravascular injection is of such a mixture of reactive toxin and its homologous antitoxin, following an earlier intradermal injection of a reactive toxin, a typical Shwartzman reaction occurs at the site of the intradermal injection upon the making of the intravascular injection if the mixture used for the latter contains too little antitoxin to neutralize the reactive toxin in the mixture, but does not occur if the mixture contained sufficient antitoxin for that neutralization.

By such titrations, done either way, it is readily possible to determine how much of any given antitoxin is necessary to neutralize a unit of the homologous reactive toxin; and in either case the least amount of antitoxin which neutralizes one unit of a reactive toxin is conveniently taken as a unit of antitoxin.

The reactive toxin may be used not only to produce immunity in animals, for causing the production in the blood of the animal of a homologous antitoxin which can be obtained by bleeding the animal, but may also be used to create and build up active immunity in cases where no such bleeding is desired or intended, as for instance in the treatment and prevention of diseases in animals or human beings. Such active immunity may be created in much the same manner as in horses that are subsequently used for bleeding—by a series of subcutaneous injections of the reactive toxin, in doses of gradually increasing size.

Instead of using merely the reactive toxin alone for creating such active immunity, mixtures of a reactive toxin with its homologous antitoxin may be used. Desirably such a mixture will be one in which the amount of antitoxin present is only a fraction of that which is necessary to obtain complete neutralization of the reactive toxin present.

In obtaining the active immunity above described, whether with the reactive toxin alone or with mixtures of the reactive toxin and its homologous antitoxin, the treatment is usually prophylactic in character, rather than therapeutic.

However, there are many cases where therapeutic treatment is necessary, as when a disease caused by an agent that produces a reactive toxin has already developed. In such a case, the treatment is with the antitoxin that is homologous to the reactive toxin of the agent that caused the disease, to produce a passive immunity. To obtain this passive immunity, the antitoxin is administered parenterally; usually in a dose of sufficient size so that only one injection is necessary. Suitable care should be taken to avoid or to combat serum reactions.

The antitoxin may also be used as a prophylactic agent, to confer passive immunity, in cases where no symptoms of a disease have appeared but exposure to it is suspected; as in the face of an epidemic.

As pointed out in my aforesaid co-pending application, Serial No. 600,076, experimental animals in which tumors are growing will develop at the site of the tumor a hemorrhagic reaction characteristic of the Shwartzman phenomenon, with or without necrosis, if only an intravascular injection of the reactive toxin is made, without any preparatory intratumoral injection. In accordance with that observation, such experimental animals in which tumors are growing have been treated with intravascular injections of a reactive toxin; both with the reactive toxin unmixed with anything else, and with such a toxin mixed with a sufficient amount of its homologous antitoxin to obtain partial neutralization of the toxin while leaving some of it unneutralized. Following such injection there is a reaction in the tumor, with hemorrhage, and with or without inflammation and necrosis. This has been done in a variety of animals, notably with mice, rats and guinea pigs. While the procedure in either case has caused regression of the tumors in many cases, yet the better effects are obtained with the mixtures in which a reactive toxin is partly neutralized with its homologous antitoxin; for in those cases complete regression of the tumors with uneventful healing has occurred in approximately 80% of the cases.

Many variations, which are well understood among bacteriologists, may be made in the procedures employed in producing reactive toxins and the homologous antitoxins, and the examples which have been given are merely illustrative of such procedures and are not intended to be limiting in their nature. For example, with respect to the reactive toxins, the bacteria producing them may be grown on any desired medium, and the agar and the broth mentioned are merely two suitable media. Similarly, with respect to the antitoxins, it is possible in effecting the immunization of the horse or other animal for production bleedings, to substitute for the reactive toxin obtained in a culture filtrate as aforesaid the live bacteria themselves capable of producing the reactive toxin. However, it is preferable to use the reactive toxin and introduce it in doses of determined unit potency because in this way the gradual building up of the immunity of the horse can be more easily checked and controlled and at the same time greater uniformity of results may be insured.

The reactive toxins and their homologous antitoxins prepared as hereinbefore described may be reduced to desiccated form, as for example by freezing in a vacuum, and then preserved indefinitely until they are to be used, when they may be taken up in any suitable menstruum appropriate to the use to which they are to be put.

If desired, the reactive toxins and their homologous antitoxins, or mixtures of these principles, may be associated with other substances or principles designed for biological or therapeutic uses, and any and all such mixtures and compositions having a determined biological potency, as respects their contained reactive toxins and/or their homologous antitoxins, whether partly neutralized or entirely unneutralized, are included in the scope of the appended claims. When other substances or principles having biological potency are present, and, as usual, it is desirable to know the content of such substances or principles, or the potency of the composition as respects such substances or principles, the amounts or potencies of such other substances or principles may be determined in any of the ways known to the art. The important thing so far as the present invention is concerned is that by means of the applicant's discoveries it is possible to produce compositions of a determined biological potency as respects the reactive toxin and/or homologous antitoxin contained therein.

I claim:

1. A composition of matter, which comprises a reactive toxin, is capable of producing the Shwartzman phenomenon, and is of determined biological potency with respect to its ability to neutralize the antitoxin homologous to said reactive toxin.

2. A composition of matter, which comprises a reactive toxin, is capable of producing the Shwartzman phenomenon, and is of determined biological potency with respect to its content of said reactive toxin.

3. A composition of matter, comprising an antitoxin homologous to a reactive toxin, said composition being of determined biological potency with respect to its ability to inhibit the production of the Shwartzman phenomenon by said reactive toxin.

4. A composition of matter, comprising an antitoxin homologous to a toxin capable of producing the Shwartzman phenomenon, said composition being of determined biological potency as determinable by the Shwartzman phenomenon.

5. A composition of matter, comprising a mixture of a reactive toxin and its homologous antitoxin and of determined biological potency as determinable by the Shwartzman phenomenon.

6. A composition of matter, comprising a mixture of a reactive toxin and a sufficient amount of its homologous antitoxin to produce partial but less than complete neutralization of the reactive toxin, which mixture is of determined biological potency as determinable by the Shwartzman phenomenon.

7. A composition of matter, comprising a mixture of a reactive toxin and a sufficient amount of its homologous antitoxin to produce partial but less than complete neutralization of the reactive toxin, which mixture is of determined biological potency with respect to its ability to neutralize the antitoxin homologous to said reactive toxin.

8. A composition of matter, comprising a mixture of a reactive toxin and its homologous antitoxin, said toxin and its homologous antitoxin being present in definite proportions determined in terms of their respective biological potencies as determinable by the Shwartzman phenomenon.

GREGORY SHWARTZMAN.